United States Patent

[11] 3,540,473

[72] Inventors Henry W. Peterson
 Millington;
 Savino A. Bucci, Rahway, New Jersey
[21] Appl. No. 678,374
[22] Filed Oct. 26, 1967
[45] Patented Nov. 17, 1970
[73] Assignee Worthington Corporation
 Harrison, New Jersey
 a corporation of Delaware

[54] SPRAY VALVE FOR WATER TREATING AND OTHER FLUID FLOW SYSTEMS
11 Claims, 8 Drawing Figs.
[52] U.S. Cl. ............................................. 137/543.15, 251/367
[51] Int. Cl. ............................................. F16k 15/00
[50] Field of Search ............................................. 137/541, 543.15, 17; 251/367; 29/checked with Moon 151/41.74(Allen)

[56] References Cited
UNITED STATES PATENTS

| 832,595 | 10/1906 | Cook | 151/41.73X |
|---|---|---|---|
| 1,931,011 | 10/1933 | Richardson et al. | 151/41.74 |
| 2,281,700 | 5/1942 | Langmaid | 151/41.74 |
| 2,676,041 | 4/1954 | Englesson | 277/205X |
| 2,888,037 | 5/1959 | Jones et al. | 137/528 |
| 3,131,718 | 5/1964 | Mingrone | 137/541X |
| 3,157,198 | 11/1964 | Wanner | 137/541X |

FOREIGN PATENTS

| 1,120,663 | 4/1956 | France | 277/205 |

Primary Examiner—William F. O'Dea
Assistant Examiner—David J. Zobkiw
Attorney—Daniel H. Bobis ABSTRACT: This invention relates to spray valves applicable for use in water treating systems but generally applicable for use in any fluid flow system in which the valve is normally maintained closed by a resilient or equivalent force and is actuated to open position when the pressure in the fluid system reaches a point sufficient to overcome the force maintaining the valve in its normally closed position. Such valves are broadly classified as check valves. In the valve of the present invention, the main elements thereof including the valve body and the coacting valve head are made from stampings of metal or other materials adapted for the purposes of this valve and the valve body includes, or has formed thereon a valve seal, a valve stem guide, attachment flanges, and means for positively locking or maintaining the valve in assembled position so that an absolutely vibrationless, nonloosening valve assembly is provided in such assembled position.

Patented Nov. 17, 1970

3,540,473

HENRY W. PETERSON
SAVINO A. BUCCI
INVENTORS

BY Daniel H. Bobis
ATTY

SPRAY VALVE FOR WATER TREATING AND OTHER FLUID FLOW SYSTEMS

PRIOR ART INFORMATION

The most pertinent prior art uncovered is identified in the list of U.S. Pat. Nos. as follows: 2,963,041, A. Vischer, Jr., Relief Valves for Flexible Wall Containers; 2,888,037, A. L. Jones et al., Magnetically Operated NonScaling Valve; and 2,844,164, E. A. Robbins, Flow Line Poppet Check Valve.

These references do not show valve assemblies formed by stampings and do not include locking means to render the spray valves absolutely nonloosening and vibrationless in assembled position.

This prior art does make clear, however, that conventional check valves made of cast materials are a well-known expedient. These valves operate on the same principle as is provided in the present invention, to wit, that some resilient, magnetic or the like type force is utilized to maintain the valve normally closed and the pressure of the fluid in the system in which the valve is utilized acts to actuate the valve to open position.

SUMMARY OF THE INVENTION

The present invention provides for an improved spray valve for a fluid distribution system wherein the valve body is stamped from a single sheet of material and simultaneously there is formed therein the valve port, a valve seat about the valve port, a valve stem pivot and an attachment flange by which the valve body can be assembled into operative relation in the fluid distribution system. The spray valve is also provided with a stamped valve head which is disposed on a valve stem slidably mounted in the valve stem pivot to permit a resilient or other force acting element to coact with the valve stem to hold the valve head in normally closed engagement with the valve seat, and the spray valve is further provided with self-contained, positive locking means on the attachment flanges so that the valve may be positively locked in assembled position to render it absolutely nonloosening or vibrationless in operation.

Accordingly, it is an object of the present invention to provide a spray valve for a fluid flow system which is of relatively simple, low cost, stamped design and construction and includes self-contained, positive locking means which will render the valve absolutely vibration proof in operation.

It is another object of the present invention to provide an improved spray valve of a stamped design having self-cleaning and noncritical, positive seating characteristics, whereby valve jamming due to foreign materials becoming lodged in the moving parts thereof, a bent valve shaft, or other problems of operation, is prevented.

It is another object of the present invention to provide an improved spray valve of a stamped design which is well adapted for mounting on either a flat or curved partition.

It is a further object of this invention to provide a stamped spray valve of particularly durable design and construction whereby long periods of satisfactory, maintenance free operation thereof are assured.

These and other objects and advantages of the invention will become evident from the following description with reference to the accompanying drawings in which:

BRIEF DESCRIPTION OF THE DRAWINGS

Referring to the drawings, FIG. 1 shows a fragment of a fluid flow system generally designated as 1 and including partition or valve support means 2 having an opening 3 formed therein to receive a spray valve generally designated as 10 and constructed in accordance with the present invention.

Figure 1:
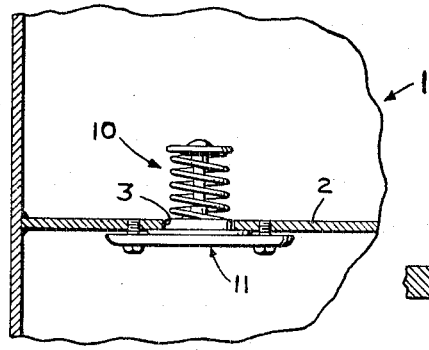
FIG. 1 is a fragmentary view of a fluid system showing a spray valve in accordance with the present invention in assembled position on a flat partition.
Figure 2:
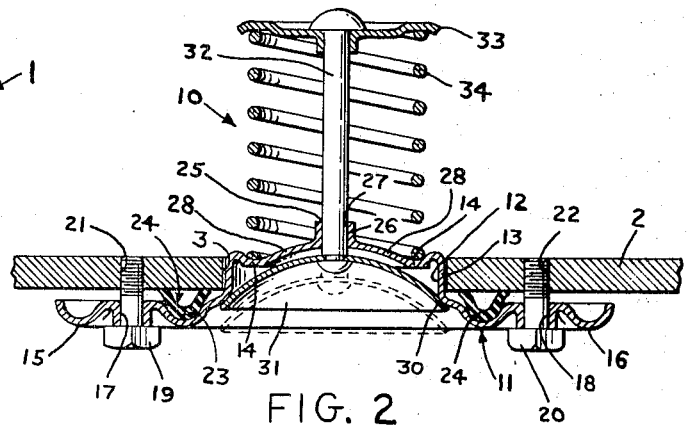
FIG. 2 shows a vertical section taken through a spray valve in accordance with the present invention.
Figure 3:
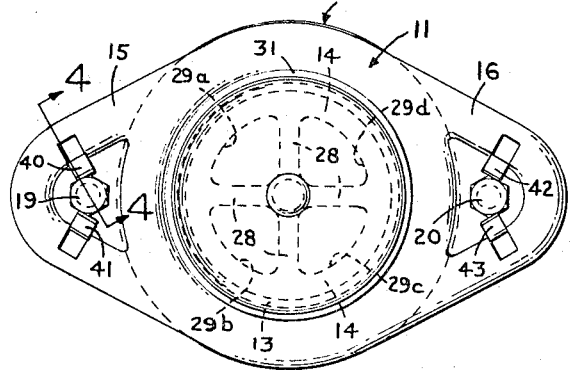
FIG. 3 is an end view of a spray valve in accordance with the present invention and depicts the valve locking means in locked position.

Valve 10 includes a valve body 11 which is stamped from sheet metal to a shape which is shown in detail in FIGS. 2 and 3 of the drawings.

As shown, valve body 11 is struck inwardly at the central portion thereof to form valve port means as generally indicated at 12, an annular shoulder 13, a transverse wall 14 and, extending radially from the portion forming the shoulder 13, a pair of lateral, attachment flanges as at 15 and 16, respectively. The lateral flanges 15 and 16 contain openings as at 17 and 18 for threaded members 19 and 20 which extend therethrough into threaded openings 21 and 22 in partition 2 on the flat surface or partition 2 of the fluid flow system.

Shoulder 13 is struck to a dimension which permits it to engage and fit as shown into the openings 3 formed in the partition 2.

An annular groove 23 is formed in the valve body 11 between the attachment flanges 15 and 16 and the annular shoulder so that a V-shaped elastomeric ring-type element 24 (FIGS. 2 and 7) can be positioned during assembly between the inner or outer face of the valve body 11 and the partition or flat surface 2 to which the valve 10 is being attached.

The transverse wall 14 during formation is stamped to provide a valve stem pivot means as generally indicated at in the central portion thereof. The said pivot means include an annular hub 26 with a stem receiving opening 27 therethrough of relatively short length or extent for purposes that will appear clear hereinafter. The hub 26 is connected by a plurality of arms or members 28 to the transverse wall 14 and thus a plurality of openings 29a, 29b, 29c and 29d as shown in FIG. 3 are formed between each pair of members 28 and the associated portion of the transverse wall 14 so that fluid can pass about the valve stem pivot means 25 and through the valve port means 12 in the valve body 11 during the operation of the valve in accordance with the present invention.

On the outer face of the valve at the point where the annular shoulder 13 is struck inwardly a valve seat 30 is formed to coact with a valve disc or head 31 connected to a valve stem or shaft 32 which extends as shown upwardly through the valve stem pivot means 25.

The valve disc or head 31 is also a stamped member and has a convexo-concavo shape of simple form to provide line sealing and to permit streamlined flow of fluid past the valve head during operation of the spray valve 10.

At the point thereon remote from the end connected to the valve disc or the valve head 31, the valve stem 32 is connected to a spring retainer 33 so that a relatively large diameter spring 34 disposed about the valve stem 32 can engage the valve spring retainer 32 at one end and the transverse wall 14 in the valve body 11 at the other end and act to normally hold the valve disc or head 31 in engagement, or closed, with respect to the valve seat 30. The use of relatively large diameter spring 34 with a diameter approximating that of valve disc 31 is of particular advantage in assuring operational stability for the valve of the invention despite the relatively short extent of valve stem pivot means 25.

The relatively short extent of the valve stem pivot means 25 is of particular significance in several respects. First, it acts as a pivot for the valve stem 32 during operation in that the overall cooperation of the spring 34, the rounded valve disc or head 31 and the valve stem pivot means 25 act to eliminate the conventional valve guide means heretofore in common use for stabilizing valve stem movement. Second, it prevents valve jamming in that it makes most unlikely the lodgment of foreign material between the coacting valve stem 32 and valve stem pivot means 25 or the opening 27 in the hub 26 thereof. Third, it would minimize the jamming effect of a bent valve shaft should this occur during operation of the fluid system or fluid treating device.

Further, this construction also provides large enough openings at 29a, 29b, 29c and 29d to reduce the extent of the pressure drop across the valve seat 30 in open position and thus the pump required for feeding fluid through the valve can be of smaller size than that heretofore used with prior art devices.

In this valve when the pressure of the fluid acting through the openings 29a, 29b, 29c and 29d is sufficiently high, it will actuate the valve disc or head 31 to an open position and, as is known, the pressure at which this will occur will be a function of the strength of the spring member 34.

Figure 7:
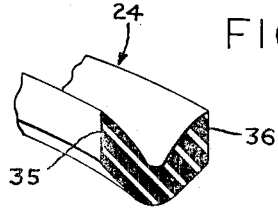
FIG. 7 shows a cross section through the V-type ring gasket embodied in the valve construction shown in FIGS. 2 and 3.
Figure 4:
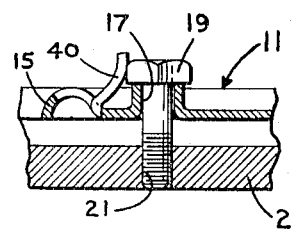
FIG. 4 is a cross section taken on line 4-4 of FIG. 3.

The V-type ring gasket 24 is an elastomeric material and, as can be readily seen in FIG. 7, consists of a convexo-concavo shape such that it includes legs 35 and 36 which can be caused to narrow or spread depending upon the pressures exerted by the threaded members 19 and 20 which attach the valve body 11 to the partition 2.

Figure 8:
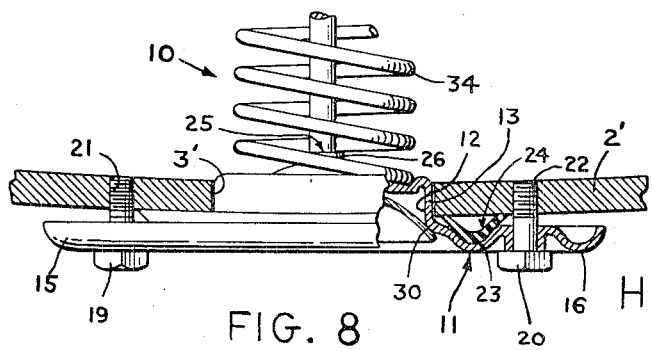
FIG. 8 shows the valve mounted on a curved partition of a member forming part of a fluid system.

Further, however, as shown in FIG. 8 of the drawings, if the valve body 11 is to be affixed to a somewhat curved partition 2', the inherent spreadability of the elastomeric member 24 comes into play in that it can spread to readily adapt to and seal the inner or outer face of the valve body 11 in assembled position despite the partition curvature.

In systems which utilize this type of valve it is noted that unless some mechanism is provided for holding the threaded members 19 and 20 in assembled position that these members will loosen and cause the valve members to fall out of position. In the present invention this is overcome by providing a suitable locking means for holding the valve in assembled position.

LOCKING MEANS

In the present invention the locking means are self-contained and are formed simultaneously when the valve body is stamped. Thus, as best seen in FIGS. 3 through 6, the locking means comprise a pair of spaced, deformable locking lugs 40 and 41 formed integrally with and extending from attachment flange 15 and a like pair of spaced, deformable locking lugs 42 and 43 formed integrally with and extending from attachment flange 16.

Figure 5:
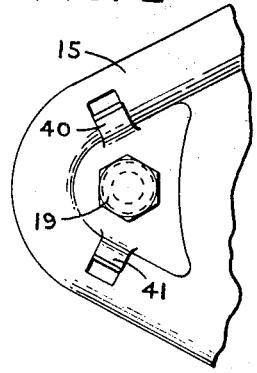
FIG. 5 is a fragmentary view of one of the self-contained locking means formed on the valve body of the form of valve shown in FIG. 2, and depicts the locking means in the unlocked position thereof.
Figure 6:
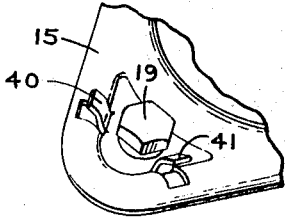
FIG. 6 is a partial perspective of the locking means of FIG. 5 depicted in open or nonlocked position.

FIGS. 5 and 6 show the lugs 42 and 43 before they have been deformed into into locking position, and in FIG. 3 the lugs are shown after they have been deformed to lock the threaded members 19 and 20 in assembled position and positively prevent the loosening of the latter through rotation thereof. This is shown in enlarged detail at FIG. 4 of the drawings wherein the locking lug 40 is shown in detail in engagement with the threaded member 19.

In assembling the spray valve 10 to the partition 2, or 2' the elastomeric ring 24 is set in the groove 23. The central portion formed by the shoulder 13 is used to center the valve in the opening 3 in the partition 2 or 2' and threaded members 19 and 20 are then threaded into the threaded partition openings to bring the elastomeric member 24 into engagement with the outer or inner face of the partition 2 or 2' whereupon sufficient pressure is exerted on the valve body 11 to spread the legs 35 and 36 of the elastomeric member 23 to the extent necessary to provide a seal about the opening 3 or 3' in the partition 2 or 2'.

After the members 19 and 20 are set so as to provide proper assembly of the spray valve 10 the locking lugs 40, 41, 42 and 43 are deformed until they are brought into engagement with the respective heads of the threaded members 19 and 20 and when so deformed will act to positively prevent the members 18 and 19 from rotating out of the position so set.

Thus a simple, easily manufactured spray valve is provided which can be made at a very low cost as compared to the analogous valves of the prior art, and which overcomes the problems of the prior art valves by providing an absolutely nonloosening and vibrationless assembly between the valve body and the partition to which it is connected.

More specifically, with regard to the truly significant cost reductions made possible through the use of the stamped valves of the invention, a detailed and carefully conducted cost study reveals the cost of the valves of the invention for a particular water treatment system application to be less than 10 percent of the cost of the formerly used, machined valves of the prior art to thus make clear that the cost per valve has been reduced by over 90 percent through the use of the valves of the invention. In addition, this study made clear that the more sturdy and reliable construction of the valve of the invention, which enable higher flow rates therethrough, made possible a reduction in the number of valves required for the particular water system application of over 30 percent.

It will be understood that the invention is not to be limited to the specific construction or arrangement of parts shown but that they may be widely modified within the invention defined by the claims.

We claim:

1. In a spray valve for use in fluid treating or other flow systems having spray valve support means, said spray valve being normally maintained closed and actuated to its opened position by the pressure of the fluid in the system, said spray valve comprising:
   a. valve body means formed from a stamped sheet of material, said valve body means comprising:
      1. attachment flange means for attachment of said valve to said support means in said fluid flow system;
      2. a valve port defined by a depression in said stamped sheet;
      3. said valve port having a plurality of openings in said depression adapted to permit the flow of fluid through said valve port;
      4. valve stem pivot means formed in said valve port;
      5. valve seat means formed in association with a bend in the surface of said stamped sheet and disposed about said valve part;
   b. a valve stem disposed in slidable engagement with said valve stem pivot means;
   c. valve head means of arcuate form attached to said valve stem and movable with the valve stem to engage and disengage said valve seat means to open and close the valve port; and
   d. resilient means about said valve stem connected at one end to the end of said valve stem remote from the valve head means and in engagement at the other end with the valve body means for normally maintaining said valve head means in engagement with the valve seat means and thereby maintain said spray valve normally closed.

2. In a spray valve as claimed in claim 1 wherein said valve stem pivot means includes:
   a. a centrally disposed hub having an opening therethrough to receive said valve stem for slidable movement in said pivot means;
   b. a plurality of radially extending support members each connected at one end to said hub and at the end remote therefrom to the valve body at a point remote from said valve seat; and
   c. the walls of the opening formed in said annular hub providing relatively limited surface engagement with said valve stem so as to permit pivotal action of the valve stem during operation of the spray valve.

3. In a spray valve as in claim 1 wherein, said resilient means have a diameter which approximates the diameter of said valve head means for coacting with said valve stem pivot means to stabilize movement of the latter during spray valve operation.

4. In a spray valve as in claim 1 further including an elastomeric seal member for mounting outboard of a said valve support means between said valve body means and said valve support means to seal said spray valve relative said valve support means.

5. In a spray valve as in claim 4 wherein, said elastomeric seal member includes spaced leg means which are spreadable into engagement with said valve support means to maintain said spray valve-valve support means seal.

6. In a spray valve for use in fluid treating and other fluid flow systems having spray support means, said spray valve being normally maintained closed and actuated to its open position by the pressure of the fluid in the system, said spray valve comprising:
  a. valve body means formed from a stamped sheet of material said valve body means comprising:
    1. attachment flange means for attachment of said valve to said support means in said fluid flow system;
    2. a valve port defined by a depression in said stamped sheet;
    3. valve stem pivot means formed in said valve body means;
    4. valve seat means formed in association with a bend in the surface of said stamped sheet disposed about said valve port;
    5. said valve port having a plurality of openings in said depression adapted to permit the flow of fluid through said valve port;
  b. a valve stem disposed in slidable engagement with said valve stem pivot means;
  c. valve head means attached to said valve stem and operative to engage and disengage from said valve seat means to open and close the valve port;
  d. attachment means protruding through said attachment flange means for coaction with said attachment flange means to attach said spray valve to said support means in the fluid flow system; and
  e. said attachment flange means including locking means for coaction with said attachment means to lock the latter and maintain said spray valve assembled on said valve support means, valve stem connected at one end to the end of said valve stem remote from the valve head means and in engagement at the other end with the valve body means for normally maintaining said valve head means in engagement with the valve seat means and thereby maintain said spray valve normally closed.

7. In a spray valve as in claim 6 wherein, said locking means comprise locking lugs which are struck from said attachment flange means.

8. In a spray valve as in claim 6 wherein, said locking means comprise locking lugs which are struck from the attachment flange means at points adjacent said attachment means and extend from said attachment flange means into contact with said attachment means to positively lock the latter.

9. In a spray valve as in claim 6 wherein further including an elastomeric seal member for mounting outboard of said valve support means between valve body means and said valve support means to seal said spray valve relative said valve support means.

10. In a spray valve as in claim 9 wherein, said elastomeric seal member includes spaced leg means which are spreadable into engagement with said valve support means to maintain said spray valve-valve support means seal.

11. In a spray valve for use in fluid treating or other fluid flow systems having spray valve support means, said spray valve being normally maintained closed and actuated to its open position by the pressure of the fluid in the system, said spray valve comprising:
  a. valve body means formed from a stamped sheet of material, said valve body comprising;
    1. attachment flange means for attachment of said valve to said support means in said fluid flow system;
    2. a valve port defined by a depression in said stamped sheet;
    3. said valve port having a plurality of openings in said depression to permit the flow of fluid through said valve port;
    4. valve stem pivot means formed in said valve port;
    5. valve seat means formed in association with a bend in the surface of said stamped sheet and disposed about said valve port;
  b. a valve stem disposed in slidable engagement with said valve stem pivot means;
  c. valve head means of arcuate form attached to said valve stem and movable with the valve stem to engage and disengage said valve seat means to open and close the valve port;
  d. resilient means about said valve stem connected at one end to the end of said valve stem remote from the valve head means and in engagement at the other end with the valve body means for normally maintaining said valve head means in engagement with the valve seat means and thereby maintain said spray valve normally closed;
  e. said resilient means having a diameter which approximates the diameter of said valve head means for coacting with the valve stem pivot means to stabilize movement of said valve stem during operation of the spray valve;
  f. attachment means protruding through said attachment flange means for coacting with said attachment flange means to attach said spray valve to said support means in the fluid flow system; and
  g. locking means on said valve body means to lock said attachment means and maintain said valve assembled on said spray valve support means.